US011687291B2

(12) United States Patent
Tan et al.

(10) Patent No.: US 11,687,291 B2
(45) Date of Patent: Jun. 27, 2023

(54) TECHNIQUES FOR NON-CONSECUTIVE LOGICAL ADDRESSES

(71) Applicant: Micron Technology, Inc., Boise, ID (US)

(72) Inventors: Hua Tan, Shanghai (CN); Fangwen Zhou, Shanghai (CN); Wenjing Chen, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/580,333

(22) Filed: Jan. 20, 2022

(65) Prior Publication Data

US 2023/0046402 A1 Feb. 16, 2023

Related U.S. Application Data

(60) Provisional application No. 63/232,986, filed on Aug. 13, 2021.

(51) Int. Cl.
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/0656* (2013.01); *G06F 3/0683* (2013.01); *G06F 12/0238* (2013.01); *G06F 2212/7201* (2013.01)

(58) Field of Classification Search
CPC .... G06F 3/0659; G06F 3/0604; G06F 3/0656; G06F 3/0683; G06F 12/023; G06F 12/0223; G06F 12/0292; G06F 12/0238; G06F 2212/7201; G06F 3/06;
(Continued)

(56) References Cited

U.S. PATENT DOCUMENTS 11,567,860 B2 * 1/2023 Kang ............... G06F 12/123
2019/0155723 A1 * 5/2019 Park ............... G06F 12/0866

OTHER PUBLICATIONS

M. D. Gomony, B. Akesson and K. Goossens, "Architecture and optimal configuration of a real-time multi-channel memory controller," 2013 Design, Automation & Test in Europe Conference & Exhibition (DATE), Grenoble, France, 2013, pp. 1307-1312, doi: 10.7873/DATE.2013.270. (Year: 2013).*

* cited by examiner

*Primary Examiner* — Khoa D Doan
(74) *Attorney, Agent, or Firm* — Holland & Hart LLP

(57) ABSTRACT

Methods, systems, and devices for memory operations are described. A first set of commands may be received for accessing a memory device. The first set of commands may include non-consecutive logical addresses that correspond to consecutively indexed physical addresses. A determination that the non-consecutive logical addresses correspond to consecutively indexed physical addresses may be determined based on a first mapping stored in a volatile memory. A second mapping may be transferred to the volatile memory based on the determination. The second mapping may include an indication of whether information stored at a set of physical address is valid. A second set of commands including non-consecutive logical addresses may be received for accessing the memory device. Data for the second set of commands that include the non-consecutive logical addresses may be retrieved from the memory device using the second mapping.

25 Claims, 5 Drawing Sheets

(58) Field of Classification Search
CPC ........ G06F 12/02–0246; G06F 12/0284–0292; G06F 12/06
See application file for complete search history.

TECHNIQUES FOR NON-CONSECUTIVE LOGICAL ADDRESSES

CROSS REFERENCE

The present Application for Patent claims priority to U.S. Provisional Patent Application No. 63/232,986 by Tan et al., entitled "TECHNIQUES FOR NON-CONSECUTIVE LOGICAL ADDRESSES", filed Aug. 13, 2021, which is assigned to the assignee hereof and is expressly incorporated by reference in its entirety herein.

FIELD OF TECHNOLOGY

The following relates generally to one or more systems for memory and more specifically to techniques for non-consecutive logical addresses.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not—or (NOR) and not—and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
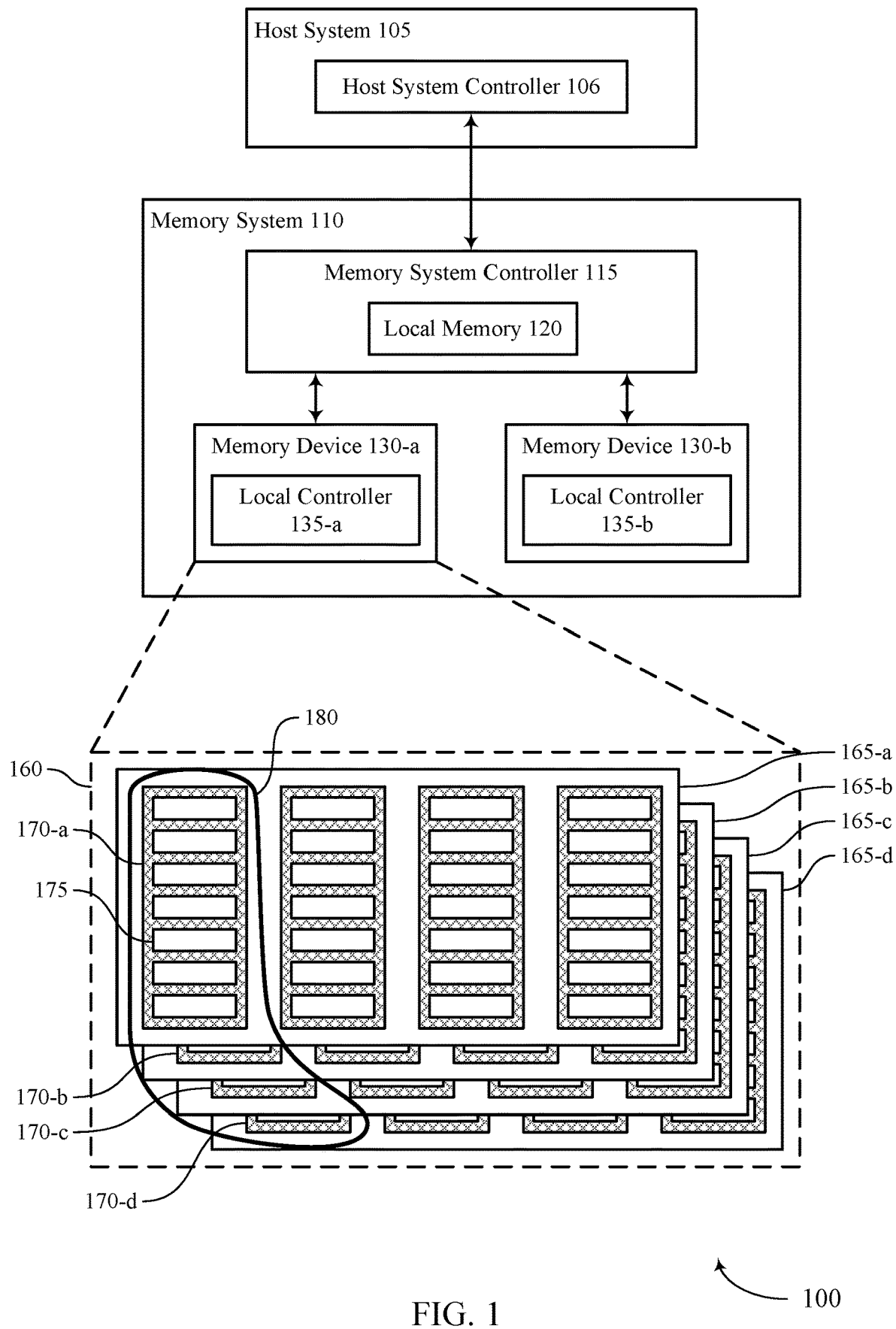
FIG. 1 illustrates an example of a system that supports techniques for non-consecutive logical addresses in accordance with examples as disclosed herein.

A host system may consistently write and rewrite (e.g., in a same order) data to a set of non-consecutive logical address associated with memory locations of a memory device. In some examples, the distance between the non-consecutive logical addresses is large, and different portions of a table that provides a mapping between logical and physical addresses may be separately loaded into a volatile memory of the memory system to determine a correspondence between the non-consecutive logical addresses and the corresponding physical addresses. In some examples, the data written to the set of non-consecutive logical addresses is stored at consecutive physical addresses of the memory device—e.g., based on the data being consistently written in the same order, even though the data is written to the non-consecutive logical addresses.

Despite the information associated with the set of non-consecutive logical addresses being stored in consecutive physical addresses, non-consecutive read techniques may be used to retrieve the information from the physical memory based on the logical addresses being non-consecutive. By contrast, if a set of commands including consecutive logical addresses that correspond to the consecutive set of physical addresses were received, a multi-plane read operation (which may also be referred to as a concurrent or sequential read operation) may be triggered. Thus, in response to a set of read commands that includes the set of non-consecutive logical addresses, individual read operations may be performed to retrieve information from individual physical addresses of the set of consecutive physical addresses instead of performing a multi-plane read operation to retrieve information from portions (or the entire) set of consecutive physical addresses. Performing individual read operations for the set of read commands may be associated with increased power consumption and higher latency than performing multi-plane read operations—e.g., based on performing additional access operations and loading different portions of a mapping between logical and physical addresses to execute the read commands.

To reduce latency, power consumption, or both of a memory system, a mode may be established for accessing a memory device in response to a set of read commands including non-consecutive logical addresses that correspond to consecutively indexed physical addresses. In response to the mode being activated, the memory system may use a validity table and metadata stored in pages of physical memory to determine a mapping between logical addresses and physical addresses. In some examples, the memory system may also perform a multi-plane read operation in response to a read command being received, where the multi-plane read operation may access consecutive physical addresses associated with a logical address of the read command. In some examples, the mode may be activated based at least in part on receiving a threshold quantity of read commands that have non-consecutive logical addresses corresponding to consecutive physical addresses. By activating the mode associated with enabling multi-plane read operations to be performed for commands including non-consecutive logical addresses, a latency, power consumption, or both, associated with executing the commands may be improved.

Figure 2:
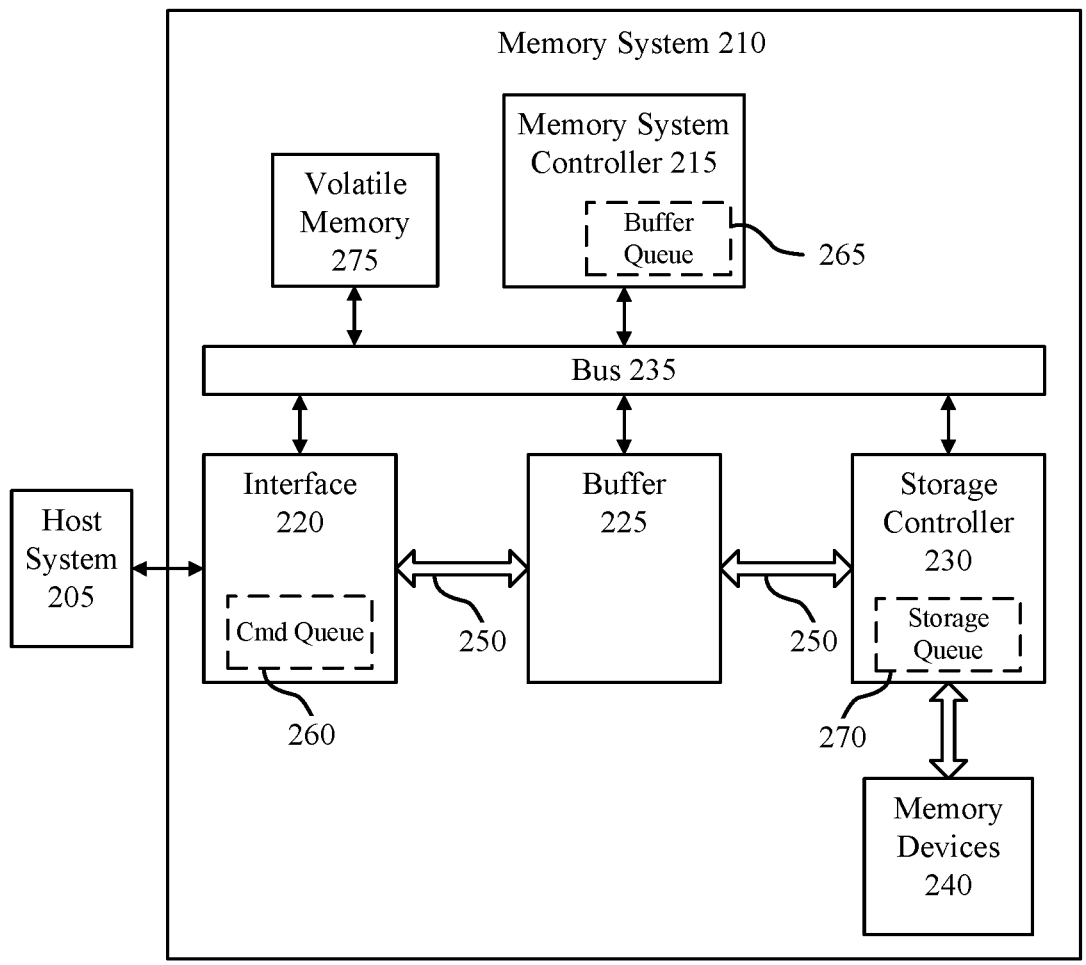
FIG. 2 illustrates an example of a system that supports techniques for non-consecutive logical addresses in accordance with examples as disclosed herein.

Features of the disclosure are initially described in the context of systems and devices with reference to FIGS. 1 through 2. Features of the disclosure are also described in the context of a flowchart. These and other features of the disclosure are further illustrated by and described in the context of an apparatus diagram and a flowchart that relate to techniques for non-consecutive logical addresses.

FIG. 1 illustrates an example of a system 100 that supports techniques for non-consecutive logical addresses in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support techniques for non-consecutive logical addresses. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

To reduce latency, power consumption, or both of a memory system, a mode may be established for accessing a memory device 130 in response to a set of read commands including non-consecutive logical addresses that correspond to consecutively indexed physical addresses. In response to the mode being activated, the memory system 110 may use a validity table and metadata stored in pages of physical memory to determine a mapping between logical addresses and physical addresses. In some examples, the memory system 110 may also perform a multi-plane read operation in response to a read command being received, where the multi-plane read operation may access consecutive physical addresses associated with a logical address of the read command. In some examples, the mode may be activated based at least in part on receiving a threshold quantity of read commands that have non-consecutive logical addresses corresponding to consecutive physical addresses.

FIG. 2 illustrates an example of a system 200 that supports techniques for non-consecutive logical addresses in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, a host system 205 consistently writes and rewrites information to non-consecutive logical addresses associated with a memory device 240—e.g., in a same order. For example, the host system 205 may consistently write and rewrite information to non-consecutive logical addresses in a same order while performing a periodic maintenance operation that periodically checks or updates the same set of information. In some examples, the host system 205 transmits, to the memory device 240, a set of commands including the non-consecutive logical addresses, where each command may be associated with subsets (e.g., of varying sizes) of the information. The memory device 240 may determine physical addresses that correspond to the non-consecutive logical addresses and write data associated with a logical address to storage elements at a corresponding physical address. In some examples, the memory device 240 uses a table that includes a mapping between physical addresses and logical addresses to determine which physical addresses correspond to the non-consecutive logical addresses. The table may be referred to as an L2P table, and a portion of the L2P table may be stored in a volatile memory 275 (e.g., an SRAM)—the entire L2P table may be too large to store in the volatile memory 275, and may instead be stored in memory devices 240.

In some examples, the distance between non-consecutive logical addresses may be large—e.g., such that logical to physical address mappings for different logical addresses of the non-consecutive logical addresses may be represented in different portions of an L2P table. In such cases, the memory device may separately load, into the volatile memory 275 from the memory devices 240, different portions of the L2P table as the non-consecutive logical addresses are processed—e.g., a first portion of the L2P table may be loaded when a command that includes a first logical address of the non-consecutive logical addresses is received and a second portion of the L2P table may be loaded when a command that includes a second logical address of the non-consecutive logical addresses is received. Accessing memory cells at non-consecutively indexed logical addresses may be referred to as a dirty read performance. In some cases, loading one portion of the L2P table into the volatile memory 275 may overwrite another portion of the L2P table stored in the volatile memory 275. Also, loading portion of the L2P table into the volatile memory 275 to execute a received read command may increase a latency associated with executing the received read command.

In some examples, after consistently rewriting the information to non-consecutive logical addresses a threshold quantity of times (e.g., in a same order), the information may be stored in physical addresses of a memory device 240 that are consecutively indexed (which may also be referred to as being sequentially indexed). Physical addresses that are consecutively indexed may be positioned in complementary locations across planes (e.g., in a commonly indexed page of a commonly indexed block in another page), positioned next to one another (e.g., in an earlier or subsequently indexed page), or both. A sequential read operation may be used to access information stored at physical addresses that are consecutively indexed, where a sequential read operation may be used to access an increased amount of data in a shorter duration than using separate read operation to access the information stored at the consecutive physical addresses.

Despite the information associated with the set of non-consecutive logical addresses being stored in consecutive physical addresses, storage controller 230 may use non-consecutive read techniques to retrieve the information from the physical memory based on the logical addresses being non-consecutive. By contrast, if the storage controller 230 were to receive a set of commands including consecutive logical addresses that correspond to the consecutive set of physical addresses, a multi-plane read operation (which may also be referred to as a concurrent or sequential read operation) may be triggered at storage controller 230. Thus, in response to a set of read commands that includes the set of non-consecutive logical addresses, the storage controller 230 may perform individual read operations to retrieve information from individual physical addresses of the set of consecutive physical addresses instead of performing a multi-plane read operation to retrieve information from portions (or the entire) set of consecutive physical addresses. Performing individual read operations for the set of read commands may be associated with increased power consumption and higher latency than performing multi-plane read operations—e.g., based on loading different portions of a mapping between logical and physical addresses to execute the read commands.

To reduce latency, power consumption, or both of a memory system, a mode may be established for accessing a memory device in response to a set of read commands including non-consecutive logical addresses that correspond to consecutively indexed physical addresses. in response to the mode being activated, the memory system may use a validity table and metadata stored in pages of physical memory to determine a mapping between logical addresses and physical addresses. In some examples, the memory system may also perform a multi-plane read operation in response to a read command being received, where the multi-plane read operation may access consecutive physical addresses associated with a logical address of the read command. In some examples, the mode may be activated based at least in part on receiving a threshold quantity of read commands that have non-consecutive logical addresses corresponding to consecutive physical addresses.

By activating the mode associated with enabling multi-plane read operations to be performed for commands including non-consecutive logical addresses, a latency, power consumption, or both, associated with executing the commands may be improved.

Figure 3:
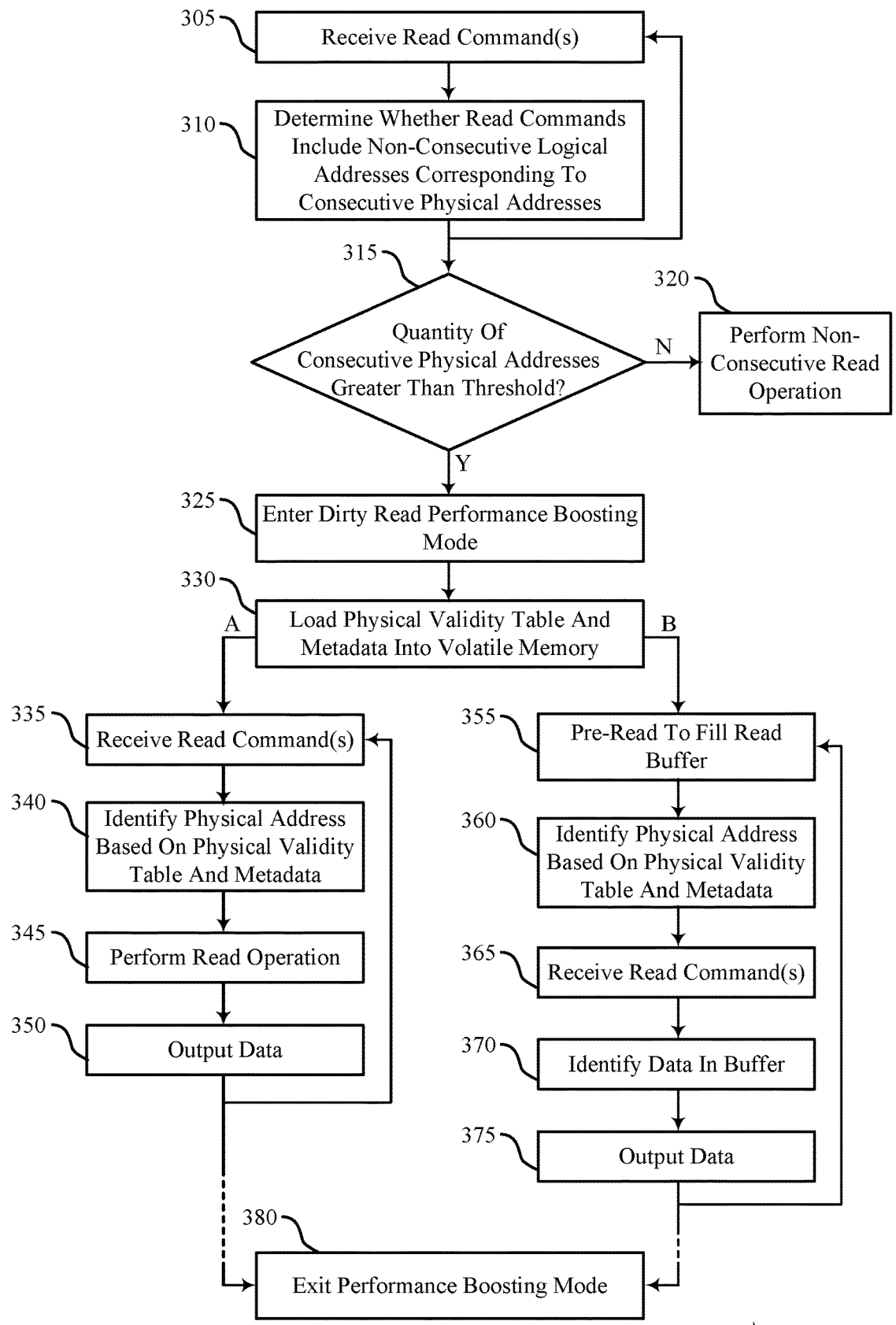
FIG. 3 illustrates an example of a flowchart that supports techniques for non-consecutive logical addresses in accordance with examples as disclosed herein.

FIG. 3 illustrates an example of a flowchart 300 that supports techniques for non-consecutive logical addresses in accordance with examples as disclosed herein.

Flowchart 300 depicts operations associated with entering a mode for increasing the performance of a memory device in response to commands including non-consecutively indexed logical addresses correspond to consecutively indexed physical address. Flowchart 300 also depicts operations associated with using a physical validity table and metadata to determine mappings between logical addresses and physical addresses after the mode is entered. The operations of flowchart 300 may be performed at a memory system, such as memory system 210 of FIG. 2.

It is understood that one or more of the operations described in flowchart 300 may be performed earlier or later in the process, omitted, replaced, supplemented, or combined with another operation. Also, additional operations described herein that are not included in flowchart 300 may be included.

At block 305, one or more read commands may be received—e.g., at an interface of a memory system, such as interface 220 of FIG. 2, from a host system, such as host system 205 of FIG. 2. The read command may include a logical address and may request that a corresponding data packet be stored at the logical address.

At block 310, whether a set of successive read commands include non-consecutive logical addresses that correspond to consecutive physical addresses may be determined. In some examples, a memory system controller (e.g., memory system controller 215 of FIG. 2) may be used to determine whether successive read commands include non-consecutive logical addresses that correspond to consecutive physical addresses. To determine whether a set of successive read commands includes non-consecutive logical addresses, the memory system controller may compare a logical address of a read command with a logical address of a preceding read command. Similarly, to determine whether non-consecutive logical addresses included in successive read commands correspond to consecutive physical addresses, the memory system controller may compare a physical address corresponding to a logical address with a physical address corresponding to a preceding logical address.

To determine which physical address corresponds to a logical address, the memory system controller may use a portion of an L2P table stored in a volatile memory (e.g., volatile memory 275 of FIG. 2). In some examples, to determine which physical address corresponds to a next logical address that is non-consecutive, the memory system controller may determine that the next logical address is not included in the portion of the L2P table stored in the volatile memory and load a second portion of the L2P table into the volatile memory that includes the next logical address. After loading the second portion of the L2P table, the memory system controller may use the second portion of the L2P table to determine which physical address corresponds to the next logical address. In some examples, the memory system controller determines that the logical addresses in successive read command are non-consecutively indexed and that the corresponding physical address are consecutively indexed.

At diamond 315, whether a quantity of read commands (e.g., successive read commands) including non-consecutive logical addresses that correspond to consecutive physical addresses exceeds a threshold (e.g., 10 instances) is determined. In some examples, the memory system controller keeps track of a quantity of such read commands. In some examples, the memory system keeps a running tally of such read commands and determines whether the quantity of such read commands within a designated period exceeds the threshold. In other examples, the memory system resets the tally of such read commands if a set of successive read commands include consecutive logical addresses or include non-consecutive logical addresses corresponding to non-consecutive physical addresses. If the memory system controller determines that the quantity of such read commands exceeds the threshold, the memory system controller may perform the operations described at block 325. Otherwise, the memory system controller may perform the operations described at block 320.

At block 320, non-consecutive read operations may be performed to access information stored at the physical addresses corresponding to the logical addresses included in the received read commands. In some examples, the memory system controller, in combination with a storage controller (e.g., storage controller 230 of FIG. 2), performs the non-consecutive read operations. In such cases, the memory system controller may perform a non-consecutive read operation for each read command, which may include individually using a relevant portion of an L2P table and reading an identified portion of memory for each read command. In some examples, using the relevant portion of the L2P table may include first loading the relevant portion of the L2P into volatile memory.

At block 325, a mode for increasing a performance of a memory device associated with processing read commands including non-consecutive logical addresses (which may be referred to as a dirty read condition) may be enabled based on a quantity of read commands including non-consecutive logical addresses that correspond to consecutive physical addresses exceeding a threshold. In some examples, the mode is activated at the memory system controller. In some examples, the memory system controller activates the mode at the storage controller. In some examples, after the mode is enabled, multi-plane read operations may be performed to execute read commands. In a first option (Option A), after performing the operations at block 330, the operations at block 335 to block 350 may be performed to execute read commands after the mode is entered. In a second option (Option B), after performing the operations at block 330, the operations at block 355 to block 375 may be performed to execute read commands after the mode is entered.

At block 330, a physical validity table and metadata associated with the received read commands may be loaded into volatile memory to use as part of the read operation—e.g., instead of using an L2P table. In some examples, the memory system controller loads, into volatile memory, a physical validity table associated with the physical addresses associated with the received read commands. In some examples, the physical validity table may indicate a validity of information stored in one or more blocks of physical addresses across one or more planes, where the block of physical addresses may include the physical addresses associated with the received read commands. The memory system controller may also load, into the volatile memory, metadata associated with the pages of physical addresses included in the one or more blocks of physical addresses. In some examples, each page stores metadata including an indication for which logical block address(es) the page stores information. Accordingly, between the physical validity table and the metadata, the memory system controller may determine a mapping between logical addresses received in a set of read commands that include non-consecutive logical addresses corresponding to physical addresses in the block of physical addresses. For example, the metadata may include a logical address that corresponds to the physical address. The memory system may be configured to access the metadata of subsequently indexed physical address and retrieve its associated logical address. The retrieved logical address may be compared with the logical address received in read command. Thus, the when physical addresses of retrieved data are consecutively indexed, the validity mapping and the metadata may be used to verify the correct physical address is being accessed instead of using the L2P mapping.

The first option for executing read commands after entering the mode (Option A) and loading the physical validity table and metadata into volatile memory is described in the context of block 335 to block 350.

At block 335, one or more read commands may be received—e.g., at an interface of the memory system. The one or more read commands may include non-consecutively-indexed logical addresses corresponding to consecutively indexed physical addresses. Based on enabling the performance boosting mode, the memory system controller may use a multi-plane read operation to execute the one or more read commands.

At block 340, a physical address corresponding to a logical address received in a read command of the one or more read commands may be identified based on the physical validity table and the metadata. In some examples, the memory system controller searches the metadata for a logical address that corresponds to the received logical address. In some cases, the memory system controller may identify multiple sets of metadata (associated with different pages) that include the logical address. The memory system controller may also use the physical validity table to determine whether the page (or which one of the pages) associated with the metadata including the logical address is storing valid information. After determining the page is storing valid information (or after identifying the page storing valid information), the memory system controller may determine the physical address corresponding to the logical address. In such cases, the memory system controller may not use an L2P table to determine a mapping between logical addresses and physical addresses, and in some examples, one or more of the portions of the L2P table previously stored in volatile memory may be removed from the volatile memory.

At block 345, a read operation (e.g., a multi-plane read operation) may be performed based on the identified physical address. In some examples, the memory system controller causes the storage controller to read memory cells at the identified physical address. In some examples, the memory system controller causes the storage controller to perform a multi-plane read of the memory cells at the identified physical address and of memory cells at consecutively indexed physical addresses (e.g., in other planes of the memory device).

At block 350, data may be outputted based on the completed read operation. In some examples, the memory system outputs data after each read operation. In some examples, the memory system controller outputs data after a multi-plane read operation that corresponds to multiple received read commands. In some examples, the memory system controller packages the read data in a DATAIN packet before outputting the data to a host system.

By loading the physical validity table and metadata into the volatile memory, read commands including non-consecutive logical addresses may be mapped to physical addresses without loading in different portions of an L2P table, decreasing power consumption and latency associated with processing read commands. Also, by enabling multi-plane read operations to be performed for read commands including non-consecutive logical addresses, an increased amount of data may be read with a single operation, further decreasing power consumption and latency associated with reading the same amount of data with multiple non-consecutive read operations.

The second option for executing read commands after entering the mode (Option B) and loading the physical validity table and metadata into volatile memory is described in the context of block 355 to block 375.

At block 355, a pre-read operation may be performed to fill a read buffer. In some examples, the pre-read operation may include performing one or more multi-plane reads of data stored in a block of memory associated with the physical validity table until some or all of the entries in read buffer are occupied. In some examples, an initial address of the multi-plane read is based on a physical address associated with the read command received immediately prior to entering the performance boosting mode. In some examples, a mapping between logical addresses and entries in the buffer may be stored in volatile memory. In some examples, a mapping between physical addresses and entries in the buffer may be stored in volatile memory. The pre-read operation may be based on a prediction that one or more physical addresses that are subsequently indexed relative to the physical address associated with the read operation may likely be requested in subsequent read operations. Such a prediction may be based on a quantity of read operations accessing consecutively indexed physical addresses.

At block 360, a physical address corresponding to a logical address received in a read command of the one or more read commands may be identified based on the physical validity table and the metadata, as similarly described with reference to block 340.

At block 365, one or more read commands may be received—e.g., at an interface of a memory system. The one or more read commands may include non-consecutively-indexed logical addresses corresponding to consecutively indexed physical addresses.

At block 370, data corresponding to the received one or more commands may be identified in the buffer. In some examples, the memory system controller, storage controller, or both, may identify entries in the buffer corresponding to logical addresses included in the one or more commands. In some examples, if data associated with a logical address is not stored in the data buffer, the storage controller may perform a read operation (e.g., a single to multi-plane read operation) to access the data from the physical memory.

At block 375, the identified data may be outputted—e.g., to a host system. In some examples, components of the memory system may package the data in a DATAIN packet before outputting the data to a host system In some examples, the identified data may be removed from the data buffer after being outputted to the host system—e.g., to free up space for additional data stored at other physical addresses.

Performing the operations of Option B may similarly decrease power consumption, latency, or both, as described with reference to Option B. In some examples, the operations of Option B may further decrease power consumption, latency, or both, by using a pre-read operation to store data in the read buffer—e.g., by decreasing a quantity of access operation performed at the memory device and based on the read buffer being accessed with less latency than the memory device.

At block 380, the performance boosting mode may be exited. In some examples, the performance boosting mode is exited based on a subsequent set of read commands including logical addresses that correspond to physical addresses in a different block than the block associated with the physical validity table and metadata stored in the volatile memory. In some examples, the performance boosting mode is exited based on receiving particular commands (e.g., based on receiving a write command or unmap command). In some examples, the memory system enters a non-consecutive read mode based on exiting the performance boosting mode.

Figure 4:
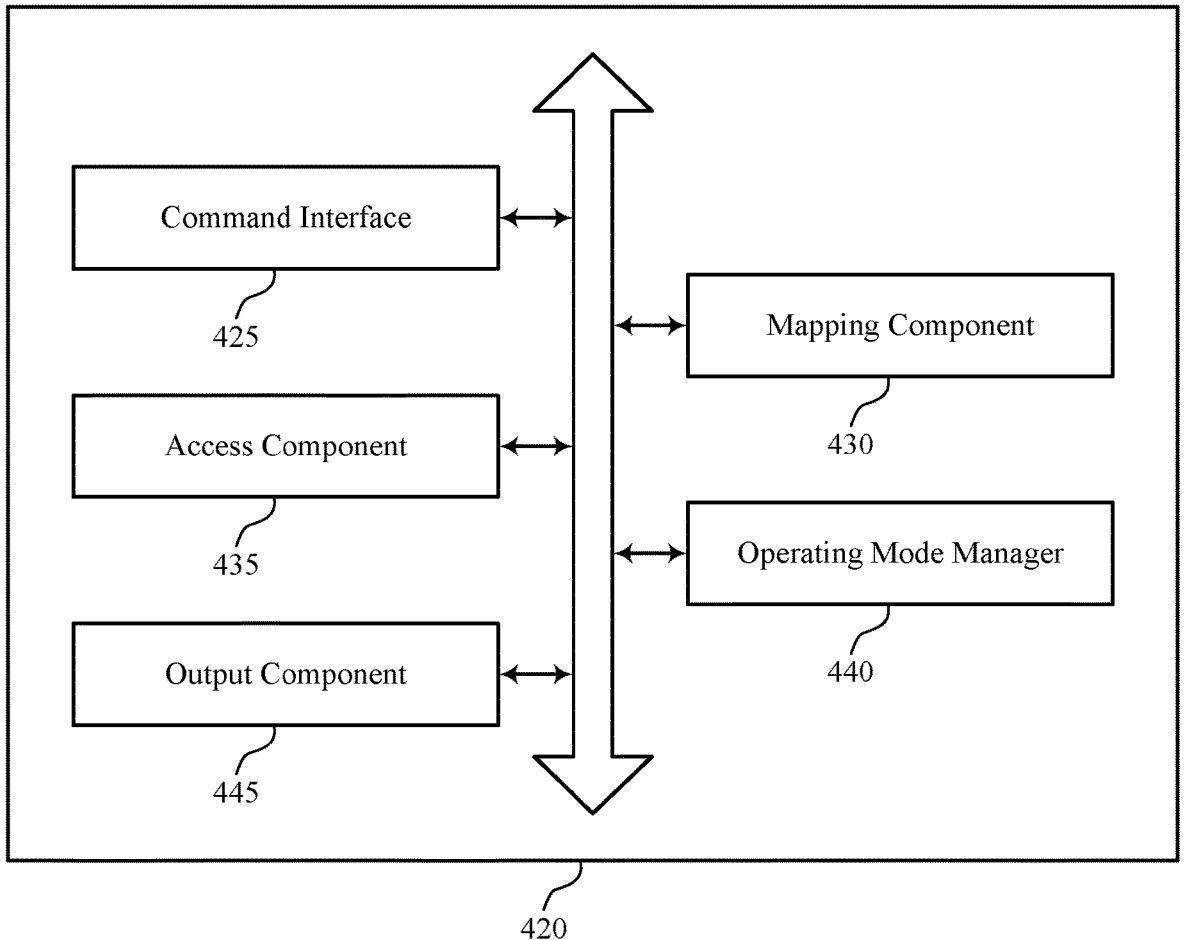
FIG. 4 shows a block diagram of a memory system that supports techniques for non-consecutive logical addresses in accordance with examples as disclosed herein.

FIG. 4 shows a block diagram 400 of a memory system 420 that supports techniques for non-consecutive logical addresses in accordance with examples as disclosed herein. The memory system 420 may be an example of aspects of a memory system as described with reference to FIGS. 1 through 3. The memory system 420, or various components thereof, may be an example of means for performing various aspects of techniques for non-consecutive logical addresses as described herein. For example, the memory system 420 may include a command interface 425, a mapping component 430, an access component 435, an operating mode manager 440, an output component 445, or any combination thereof. Each of these components may communicate, directly or indirectly, with one another (e.g., via one or more buses).

The command interface 425 may be configured as or otherwise support a means for receiving a first set of commands for accessing a memory device, the first set of commands including a first set of logical addresses that are non-consecutive. The mapping component 430 may be configured as or otherwise support a means for determining, based at least in part on a first mapping between logical addresses and physical addresses of the memory device, whether a first set of physical addresses are consecutively indexed, the first set of physical addresses corresponding to the first set of logical addresses. In some examples, the mapping component 430 may be configured as or otherwise support a means for transferring a second mapping from the memory device to a volatile memory device based at least in part on determining that the first set of physical addresses are consecutively indexed, the second mapping indicating whether information stored at a second set of physical addresses that includes the first set of physical addresses is valid. In some examples, the command interface 425 may be configured as or otherwise support a means for receiving a second set of commands for accessing the memory device, the second set of commands including a second set of logical addresses that are non-consecutive. The access component 435 may be configured as or otherwise support a means for retrieving, in response to the second set of commands, data from the memory device from a subset of the second set of physical addresses that correspond to the second set of logical addresses using the second mapping.

In some examples, to support determining whether the first set of physical addresses are consecutively indexed, the mapping component 430 may be configured as or otherwise support a means for determining that the first set of physical addresses are consecutively indexed based at least in part on the first mapping, where a quantity of the first set of physical addresses that are consecutively indexed is greater than a threshold.

In some examples, the operating mode manager 440 may be configured as or otherwise support a means for activating, based at least in part on determining that the first set of physical addresses are consecutively indexed, a mode associated with accessing data stored at consecutive physical addresses, where the second mapping is transferred to the volatile memory device and the second mapping is used to retrieve the data associated with the second set of commands based at least in part on the mode being activated.

In some examples, the operating mode manager 440 may be configured as or otherwise support a means for disabling the mode based at least in part on receiving a command for accessing the memory device that includes a logical address that corresponds to a physical address that is non-overlapping with the second set of physical addresses.

In some examples, the operating mode manager 440 may be configured as or otherwise support a means for disabling the mode based at least in part on receiving a command for writing to the memory device or performing an unmap operation.

In some examples, to support transferring the second mapping, the mapping component 430 may be configured as or otherwise support a means for transferring to the volatile memory device a third mapping that indicates whether data stored at the second set of physical addresses is valid or invalid, and a third set of logical addresses stored at respective pages associated with the second set of physical addresses, the third set of logical addresses including at least a portion of the second set of logical addresses.

In some examples, the mapping component 430 may be configured as or otherwise support a means for determining a correspondence between a subset of the third set of logical addresses and the second set of physical addresses, where the second mapping is based at least in part on the correspondence.

In some examples, to support retrieving the data from the memory device, the access component 435 may be configured as or otherwise support a means for performing a set of read operations on a consecutive set of physical addresses indicated in the second mapping based at least in part on receiving the second set of commands. In some examples, to support retrieving the data from the memory device, the access component 435 may be configured as or otherwise support a means for storing a set of data in a buffer based at least in part on performing the set of read operations. In some examples, to support retrieving the data from the memory device, the access component 435 may be configured as or otherwise support a means for identifying, in the buffer, a subset of the set of data corresponding to the second set of commands. In some examples, to support retrieving the data from the memory device, the output component 445 may be configured as or otherwise support a means for transferring the subset of the set of data from the buffer to an output buffer to be sent to a host system based at least in part on identifying the subset of the set of data.

In some examples, the output component 445 may be configured as or otherwise support a means for transmitting the subset of the set of data to the host system based at least in part on the transferring.

In some examples, to support retrieving the data from the memory device, the mapping component 430 may be configured as or otherwise support a means for retrieving the data without using the first mapping.

In some examples, to support determining whether the first set of physical addresses are consecutively indexed, the mapping component 430 may be configured as or otherwise support a means for transferring a plurality of portions of the first mapping from the memory device to the volatile memory device based at least in part on the first set of logical addresses, where subsets of the first set of logical addresses are associated with different portions of the plurality of portions based at least in part on the first set of logical addresses being non-consecutive.

In some examples, to support determining whether the first set of physical addresses are consecutively indexed, the mapping component 430 may be configured as or otherwise support a means for transferring an entirety of the second mapping to the volatile memory device based at least in part on determining that the first set of physical addresses are consecutively indexed.

In some examples, the second mapping indicates whether the second set of physical addresses store valid data or invalid data, the second set of physical addresses being associated with a third set of logical addresses that includes the first set of logical addresses and the second set of logical addresses.

Figure 5:
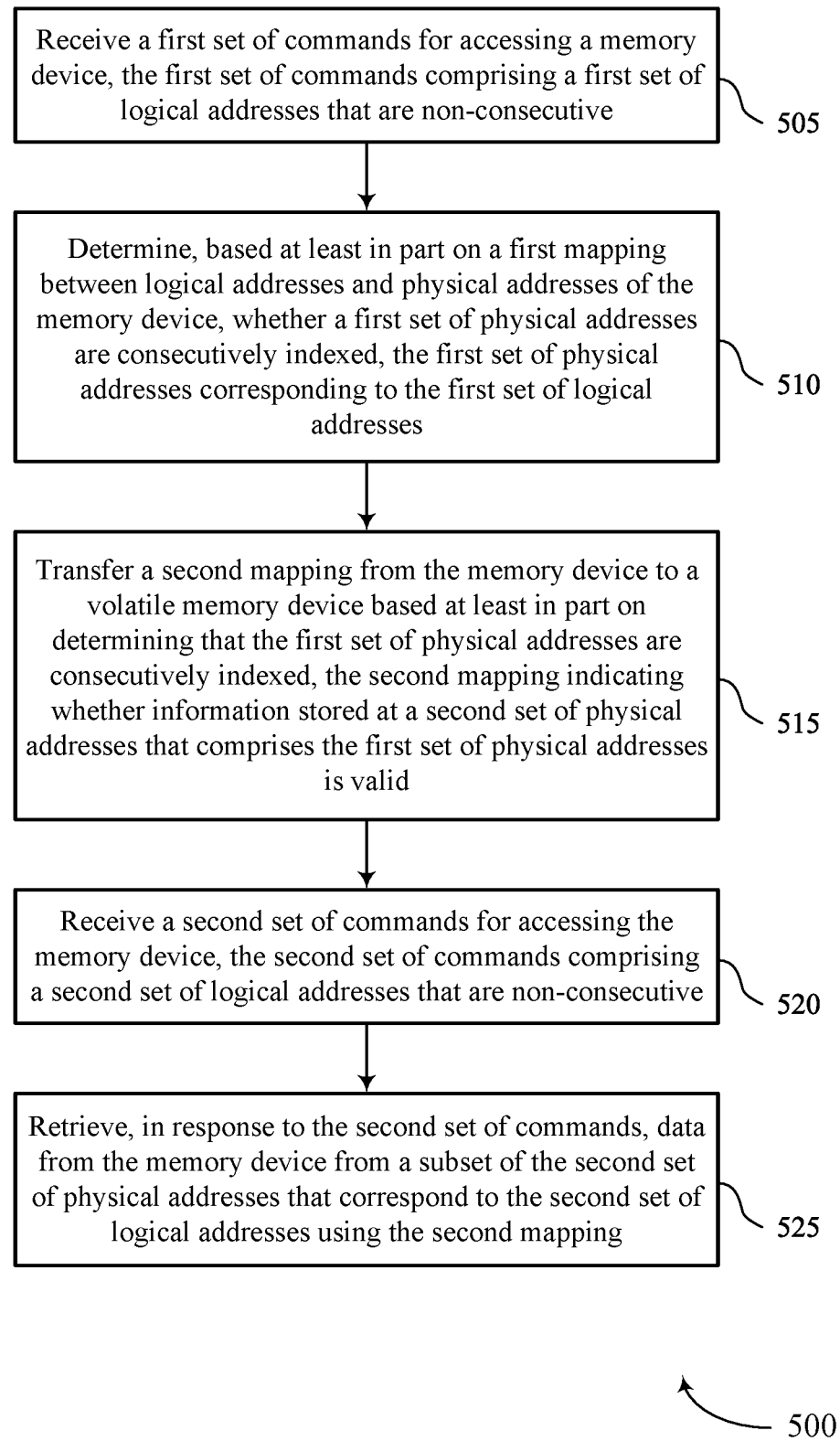
FIG. 5 shows a flowchart illustrating a method or methods that support techniques for non-consecutive logical addresses in accordance with examples as disclosed herein.

FIG. 5 shows a flowchart illustrating a method 500 that supports techniques for non-consecutive logical addresses in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving a first set of commands for accessing a memory device, the first set of commands including a first set of logical addresses that are non-consecutive. The operations of 505 may be performed in accordance with examples as disclosed herein. In some examples, aspects of the operations of 505 may be performed by a command interface 425 as described with reference to FIG. 4.

At 510, the method may include determining, based at least in part on a first mapping between logical addresses and physical addresses of the memory device, whether a first set of physical addresses are consecutively indexed, the first set of physical addresses corresponding to the first set of logical addresses. The operations of 510 may be performed in accordance with examples as disclosed herein. In some examples, aspects of the operations of 510 may be performed by a mapping component 430 as described with reference to FIG. 4.

At 515, the method may include transferring a second mapping from the memory device to a volatile memory device based at least in part on determining that the first set of physical addresses are consecutively indexed, the second mapping indicating whether information stored at a second set of physical addresses that includes the first set of physical addresses is valid. The operations of 515 may be performed in accordance with examples as disclosed herein. In some examples, aspects of the operations of 515 may be performed by a mapping component 430 as described with reference to FIG. 4.

At 520, the method may include receiving a second set of commands for accessing the memory device, the second set of commands including a second set of logical addresses that are non-consecutive. The operations of 520 may be performed in accordance with examples as disclosed herein. In some examples, aspects of the operations of 520 may be performed by a command interface 425 as described with reference to FIG. 4.

At 525, the method may include retrieving, in response to the second set of commands, data from the memory device from a subset of the second set of physical addresses that correspond to the second set of logical addresses using the second mapping. The operations of 525 may be performed in accordance with examples as disclosed herein. In some examples, aspects of the operations of 525 may be performed by an access component 435 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for receiving a first set of commands for accessing a memory device, the first set of commands including a first set of logical addresses that are non-consecutive, determining, based at least in part on a first mapping between logical addresses and physical addresses of the memory device, whether a first set of physical addresses are consecutively indexed, the first set of physical addresses corresponding to the first set of logical addresses, transferring a second mapping from the memory device to a volatile memory device based at least in part on determining that the first set of physical addresses are consecutively indexed, the second mapping indicating whether information stored at a second set of physical addresses that includes the first set of physical addresses is valid, receiving a second set of commands for accessing the memory device, the second set of commands including a second set of logical addresses that are non-consecutive, and retrieving, in response to the second set of commands, data from the memory device from a subset of the second set of physical addresses that correspond to the second set of logical addresses using the second mapping.

In some examples of the method 500 and the apparatus described herein, determining whether the first set of physical addresses may be consecutively indexed may include operations, features, circuitry, logic, means, or instructions for determining that the first set of physical addresses may be consecutively indexed based at least in part on the first mapping, where a quantity of the first set of physical addresses that may be consecutively indexed may be greater than a threshold.

In some examples of the method 500 and the apparatus described herein, activating, based at least in part on determining that the first set of physical addresses may be consecutively indexed, a mode associated with accessing data stored at consecutive physical addresses, where the second mapping may be transferred to the volatile memory device and the second mapping may be used to retrieve the data associated with the second set of commands based at least in part on the mode being activated.

Some examples of the method 500 and the apparatus described herein may further include operations, features, circuitry, logic, means, or instructions for disabling the mode based at least in part on receiving a command for accessing the memory device that includes a logical address that corresponds to a physical address that may be non-overlapping with the second set of physical addresses.

Some examples of the method 500 and the apparatus described herein may further include operations, features, circuitry, logic, means, or instructions for disabling the mode based at least in part on receiving a command for writing to the memory device or performing an unmap operation.

In some examples of the method 500 and the apparatus described herein, transferring the second mapping may include operations, features, circuitry, logic, means, or instructions for transferring to the volatile memory device a third mapping that indicates whether data stored at the second set of physical addresses may be valid or invalid, and a third set of logical addresses stored at respective pages associated with the second set of physical addresses, the third set of logical addresses including at least a portion of the second set of logical addresses.

Some examples of the method 500 and the apparatus described herein may further include operations, features, circuitry, logic, means, or instructions for determining a correspondence between a subset of the third set of logical addresses and the second set of physical addresses, where the second mapping may be based at least in part on the correspondence.

In some examples of the method 500 and the apparatus described herein, retrieving the data from the memory device may include operations, features, circuitry, logic, means, or instructions for performing a set of read operations on a consecutive set of physical addresses indicated in the second mapping based at least in part on receiving the second set of commands, storing a set of data in a buffer based at least in part on performing the set of read operations, identifying, in the buffer, a subset of the set of data corresponding to the second set of commands, and transferring the subset of the set of data from the buffer to an output buffer to be sent to a host system based at least in part on identifying the subset of the set of data.

Some examples of the method 500 and the apparatus described herein may further include operations, features, circuitry, logic, means, or instructions for transmitting the subset of the set of data to the host system based at least in part on the transferring.

In some examples of the method 500 and the apparatus described herein, retrieving the data from the memory device may include operations, features, circuitry, logic, means, or instructions for retrieving the data without using the first mapping.

In some examples of the method 500 and the apparatus described herein, determining whether the first set of physical addresses may be consecutively indexed may include operations, features, circuitry, logic, means, or instructions for transferring a plurality of portions of the first mapping from the memory device to the volatile memory device based at least in part on the first set of logical addresses, where subsets of the first set of logical addresses may be associated with different portions of the plurality of portions based at least in part on the first set of logical addresses being non-consecutive.

In some examples of the method 500 and the apparatus described herein, determining whether the first set of physical addresses may be consecutively indexed may include operations, features, circuitry, logic, means, or instructions for transferring an entirety of the second mapping to the volatile memory device based at least in part on determining that the first set of physical addresses may be consecutively indexed.

In some examples of the method 500 and the apparatus described herein, the second mapping indicates whether the second set of physical addresses store valid data or invalid data, the second set of physical addresses being associated with a third set of logical addresses that includes the first set of logical addresses and the second set of logical addresses.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory device, a controller coupled with the memory device and configured to cause the apparatus to, receive a first set of commands for accessing the memory device, the first set of commands including a first set of logical addresses that are non-consecutive, determine, based at least in part on a first mapping between logical addresses and physical addresses of the memory device, whether a first set of physical addresses are consecutively indexed, the first set of physical addresses corresponding to the first set of logical addresses, transfer a second mapping from the memory device to a volatile memory device based at least in part on determining that the first set of physical addresses are consecutively indexed, the second mapping indicating whether information stored at a second set of physical addresses that includes the first set of physical addresses is valid, receive a second set of commands for accessing the memory device, the second set of commands including a second set of logical addresses that are non-consecutive, and retrieve, in response to the second set of commands, data from the memory device from a subset of the second set of physical addresses that correspond to the second set of logical addresses using the second mapping.

In some examples, the apparatus may include determine that the first set of physical addresses may be consecutively indexed based at least in part on the first mapping, where a quantity of the first set of physical addresses that may be consecutively indexed may be greater than a threshold.

In some examples of the apparatus, the controller may be further configured to cause the apparatus to activate, based at least in part on determining that the first set of physical addresses may be consecutively indexed, a mode associated with accessing data stored at consecutive physical addresses, where the second mapping may be transferred to the volatile memory device and the second mapping may be used to retrieve the data associated with the second set of commands based at least in part on the mode being activated.

In some examples of the apparatus, the controller may be further configured to cause the apparatus to disable the mode based at least in part on receiving a command for accessing the memory device that includes a logical address that corresponds to a physical address that may be non-overlapping with the second set of physical addresses.

In some examples of the apparatus, the controller may be further configured to cause the apparatus to disable the mode based at least in part on receiving a command for writing to the memory device or performing an unmap operation.

In some examples, the apparatus may include transfer, to the volatile memory device, a third mapping that indicates whether data stored at the second set of physical addresses may be valid or invalid, and a third set of logical addresses stored at respective pages associated with the second set of physical addresses, the third set of logical addresses including at least a portion of the second set of logical addresses.

In some examples, the apparatus may include determine a correspondence between a subset of the third set of logical addresses and the second set of physical addresses, where the second mapping may be based at least in part on the correspondence.

In some examples, the apparatus may include perform a set of read operations on a consecutive set of physical addresses indicated in the second mapping based at least in part on receiving the second set of commands, store a set of data in a buffer based at least in part on performing the set of read operations, identify, in the buffer, a subset of the set of data corresponding to the second set of commands, and transfer the subset of the set of data from the buffer to an output buffer to be sent to a host system based at least in part on identifying the subset of the set of data.

In some examples, the apparatus may include transmit the subset of the set of data to the host system based at least in part on the transferring.

In some examples, the apparatus may include retrieve the data without using the first mapping.

In some examples, the apparatus may include transfer a plurality of portions of the first mapping from the memory device to the volatile memory device based at least in part on the first set of logical addresses, where subsets of the first set of logical addresses may be associated with different portions of the plurality of portions based at least in part on the first set of logical addresses being non-consecutive.

In some examples, the apparatus may include transfer an entirety of the second mapping to the volatile memory device based at least in part on determining that the first set of physical addresses may be consecutively indexed.

In some examples of the apparatus, the second mapping indicates whether the second set of physical addresses store valid data or invalid data, the second set of physical addresses being associated with a third set of logical addresses that includes the first set of logical addresses and the second set of logical addresses.

Another apparatus is described. The apparatus may include a non-transitory computer readable medium storing code comprising instruction which, when executed by a processor of an electronic device, cause the electronic device to receive a first set of commands for accessing a memory device, the first set of commands including a first set of logical addresses that are non-consecutive, determine, based at least in part on a first mapping between logical addresses and physical addresses of the memory device, whether a first set of physical addresses are consecutively indexed, the first set of physical addresses corresponding to the first set of logical addresses, transfer a second mapping from the memory device to a volatile memory device based at least in part on determining that the first set of physical addresses are consecutively indexed, the second mapping indicating whether information stored at a second set of physical addresses that includes the first set of physical addresses is valid, receive a second set of commands for accessing the memory device, the second set of commands including a second set of logical addresses that are non-consecutive, and retrieve, in response to the second set of commands, data from the memory device from a subset of the second set of physical addresses that correspond to the second set of logical addresses using the second mapping.

In some examples, to determine whether the first set of physical addresses are consecutively indexed, the instructions, when executed by the processor of the electronic device, further cause the electronic device to determine that the first set of physical addresses may be consecutively indexed based at least in part on the first mapping, where a quantity of the first set of physical addresses that may be consecutively indexed may be greater than a threshold.

In some examples of the apparatus, the instructions, when executed by the processor of the electronic device, further cause the electronic device to activate, based at least in part on determining that the first set of physical addresses may be consecutively indexed, a mode associated with accessing data stored at consecutive physical addresses, where the second mapping may be transferred to the volatile memory device and the second mapping may be used to retrieve the data associated with the second set of commands based at least in part on the mode being activated.

In some examples, to transfer the second mapping, the instructions, when executed by the processor of the electronic device, further cause the electronic device to transfer, to the volatile memory device, a third mapping that indicates whether data stored at the second set of physical addresses may be valid or invalid, and a third set of logical addresses stored at respective pages associated with the second set of physical addresses, the third set of logical addresses including at least a portion of the second set of logical addresses.

In some examples, to retrieve the data from the memory device, the instructions, when executed by the processor of the electronic device, further cause the electronic device to perform a set of read operations on a consecutive set of physical addresses indicated in the second mapping based at least in part on receiving the second set of commands, store a set of data in a buffer based at least in part on performing the set of read operations, identify, in the buffer, a subset of the set of data corresponding to the second set of commands, and transfer the subset of the set of data from the buffer to an output buffer to be sent to a host system based at least in part on identifying the subset of the set of data.

In some examples, to retrieve the data in response to the second set of commands, the instructions, when executed by the processor of the electronic device, further cause the electronic device to retrieve the data without using the first mapping.

In some examples, to determine whether the first set of physical addresses are consecutively indexed, the instructions, when executed by the processor of the electronic device, further cause the electronic device to transfer a plurality of portions of the first mapping from the memory device to the volatile memory device based at least in part on the first set of logical addresses, where subsets of the first set of logical addresses may be associated with different portions of the plurality of portions based at least in part on the first set of logical addresses being non-consecutive.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. An apparatus, comprising:
   a memory device; and
   a controller coupled with the memory device and configured to cause the apparatus to:

receive a first set of commands for accessing the memory device, the first set of commands comprising a first set of logical addresses that are non-consecutive;

determine, based at least in part on a first mapping between logical addresses and physical addresses of the memory device, whether a first set of physical addresses are consecutively indexed, the first set of physical addresses corresponding to the first set of logical addresses;

transfer a second mapping from the memory device to a volatile memory device based at least in part on determining that the first set of physical addresses are consecutively indexed, the second mapping indicating whether information stored at a second set of physical addresses that comprises the first set of physical addresses is valid;

receive a second set of commands for accessing the memory device, the second set of commands comprising a second set of logical addresses that are non-consecutive; and retrieve, in response to the second set of commands, data from the memory device from a subset of the second set of physical addresses that correspond to the second set of logical addresses using the second mapping.

2. The apparatus of claim 1, wherein, to determine whether the first set of physical addresses are consecutively indexed, the controller is further configured to cause the apparatus to:

determine that the first set of physical addresses are consecutively indexed based at least in part on the first mapping, wherein a quantity of the first set of physical addresses that are consecutively indexed is greater than a threshold.

3. The apparatus of claim 1, wherein the controller is further configured to cause the apparatus to:

activate, based at least in part on determining that the first set of physical addresses are consecutively indexed, a mode associated with accessing data stored at consecutive physical addresses, wherein the second mapping is transferred to the volatile memory device and the second mapping is used to retrieve the data associated with the second set of commands based at least in part on the mode being activated.

4. The apparatus of claim 3, wherein the controller is further configured to cause the apparatus to:

disable the mode based at least in part on receiving a command for accessing the memory device that comprises a logical address that corresponds to a physical address that is non-overlapping with the second set of physical addresses.

5. The apparatus of claim 3, wherein the controller is further configured to cause the apparatus to:

disable the mode based at least in part on receiving a command for writing to the memory device or performing an unmap operation.

6. The apparatus of claim 1, wherein, to transfer the second mapping, the controller is further configured to cause the apparatus to:

transfer, to the volatile memory device:
a third mapping that indicates whether data stored at the second set of physical addresses is valid or invalid, and
a third set of logical addresses stored at respective pages associated with the second set of physical addresses, the third set of logical addresses comprising at least a portion of the second set of logical addresses.

7. The apparatus of claim 6, wherein the controller is further configured to cause the apparatus to:

determine a correspondence between a subset of the third set of logical addresses and the second set of physical addresses, wherein the second mapping is based at least in part on the correspondence.

8. The apparatus of claim 1, wherein, to retrieve the data from the memory device, the controller is further configured to cause the apparatus to:

perform a set of read operations on a consecutive set of physical addresses indicated in the second mapping based at least in part on receiving the second set of commands;

store a set of data in a buffer based at least in part on performing the set of read operations;

identify, in the buffer, a subset of the set of data corresponding to the second set of commands; and transfer the subset of the set of data from the buffer to an output buffer to be sent to a host system based at least in part on identifying the subset of the set of data.

9. The apparatus of claim 8, wherein the controller is further configured to cause the apparatus to:

transmit the subset of the set of data to the host system based at least in part on the transferring.

10. The apparatus of claim 1, wherein, to retrieve the data in response to the second set of commands, the controller is further configured to cause the apparatus to:

retrieve the data without using the first mapping.

11. The apparatus of claim 1, wherein, to determine whether the first set of physical addresses are consecutively indexed, the controller is further configured to cause the apparatus to:

transfer a plurality of portions of the first mapping from the memory device to the volatile memory device based at least in part on the first set of logical addresses, wherein subsets of the first set of logical addresses are associated with different portions of the plurality of portions based at least in part on the first set of logical addresses being non-consecutive.

12. The apparatus of claim 11, wherein, to transfer the second mapping to the volatile memory device, the controller is further configured to cause the apparatus to:

transfer an entirety of the second mapping to the volatile memory device based at least in part on determining that the first set of physical addresses are consecutively indexed.

13. The apparatus of claim 1, wherein the second mapping indicates whether the second set of physical addresses store valid data or invalid data, the second set of physical addresses being associated with a third set of logical addresses that comprises the first set of logical addresses and the second set of logical addresses.

14. A non-transitory computer-readable medium storing code comprising instructions which, when executed by a processor of an electronic device, cause the electronic device to:

receive a first set of commands for accessing a memory device, the first set of commands comprising a first set of logical addresses that are non-consecutive;

determine, based at least in part on a first mapping between logical addresses and physical addresses of the memory device, whether a first set of physical addresses are consecutively indexed, the first set of physical addresses corresponding to the first set of logical addresses;

transfer a second mapping from the memory device to a volatile memory device based at least in part on determining that the first set of physical addresses are consecutively indexed, the second mapping indicating whether information stored at a second set of physical addresses that comprises the first set of physical addresses is valid;

receive a second set of commands for accessing the memory device, the second set of commands comprising a second set of logical addresses that are non-consecutive; and retrieve, in response to the second set of commands, data from the memory device from a subset of the second set of physical addresses that correspond to the second set of logical addresses using the second mapping.

15. The non-transitory computer-readable medium of claim 14, wherein, to determine whether the first set of physical addresses are consecutively indexed, the instructions, when executed by the processor of the electronic device, further cause the electronic device to:

determine that the first set of physical addresses are consecutively indexed based at least in part on the first mapping, wherein a quantity of the first set of physical addresses that are consecutively indexed is greater than a threshold.

16. The non-transitory computer-readable medium of claim 14, wherein the instructions, when executed by the processor of the electronic device, further cause the electronic device to:

activate, based at least in part on determining that the first set of physical addresses are consecutively indexed, a mode associated with accessing data stored at consecutive physical addresses, wherein the second mapping is transferred to the volatile memory device and the second mapping is used to retrieve the data associated with the second set of commands based at least in part on the mode being activated.

17. The non-transitory computer-readable medium of claim 14, wherein, to transfer the second mapping, the instructions, when executed by the processor of the electronic device, further cause the electronic device to:

transfer, to the volatile memory device:
a third mapping that indicates whether data stored at the second set of physical addresses is valid or invalid, and
a third set of logical addresses stored at respective pages associated with the second set of physical addresses, the third set of logical addresses comprising at least a portion of the second set of logical addresses.

18. The non-transitory computer-readable medium of claim 14, wherein, to retrieve the data from the memory device, the instructions, when executed by the processor of the electronic device, further cause the electronic device to:

perform a set of read operations on a consecutive set of physical addresses indicated in the second mapping based at least in part on receiving the second set of commands;

store a set of data in a buffer based at least in part on performing the set of read operations;

identify, in the buffer, a subset of the set of data corresponding to the second set of commands; and transfer the subset of the set of data from the buffer to an output buffer to be sent to a host system based at least in part on identifying the subset of the set of data.

19. The non-transitory computer-readable medium of claim 14, wherein, to retrieve the data in response to the second set of commands, the instructions, when executed by the processor of the electronic device, further cause the electronic device to:

retrieve the data without using the first mapping.

20. The non-transitory computer-readable medium of claim 14, wherein, to determine whether the first set of physical addresses are consecutively indexed, the instructions, when executed by the processor of the electronic device, further cause the electronic device to:

transfer a plurality of portions of the first mapping from the memory device to the volatile memory device based at least in part on the first set of logical addresses, wherein subsets of the first set of logical addresses are associated with different portions of the plurality of portions based at least in part on the first set of logical addresses being non-consecutive.

21. A method, comprising:

receiving a first set of commands for accessing a memory device, the first set of commands comprising a first set of logical addresses that are non-consecutive;

determining, based at least in part on a first mapping between logical addresses and physical addresses of the memory device, whether a first set of physical addresses are consecutively indexed, the first set of physical addresses corresponding to the first set of logical addresses;

transferring a second mapping from the memory device to a volatile memory device based at least in part on determining that the first set of physical addresses are consecutively indexed, the second mapping indicating whether information stored at a second set of physical addresses that comprises the first set of physical addresses is valid;

receiving a second set of commands for accessing the memory device, the second set of commands comprising a second set of logical addresses that are non-consecutive; and retrieving, in response to the second set of commands, data from the memory device from a subset of the second set of physical addresses that correspond to the second set of logical addresses using the second mapping.

22. The method of claim 21, wherein determining whether the first set of physical addresses are consecutively indexed comprises:

determining that the first set of physical addresses are consecutively indexed based at least in part on the first mapping, wherein a quantity of the first set of physical addresses that are consecutively indexed is greater than a threshold.

23. The method of claim 21, further comprising:

activating, based at least in part on determining that the first set of physical addresses are consecutively indexed, a mode associated with accessing data stored at consecutive physical addresses, wherein the second mapping is transferred to the volatile memory device and the second mapping is used to retrieve the data associated with the second set of commands based at least in part on the mode being activated.

24. The method of claim 21, wherein transferring the second mapping comprises transferring to the volatile memory device:

a third mapping that indicates whether data stored at the second set of physical addresses is valid or invalid, and a third set of logical addresses stored at respective pages associated with the second set of physical addresses, the third set of logical addresses comprising at least a portion of the second set of logical addresses.

25. The method of claim 21, wherein retrieving the data from the memory device comprises:

performing a set of read operations on a consecutive set of physical addresses indicated in the second mapping based at least in part on receiving the second set of commands;

storing a set of data in a buffer based at least in part on performing the set of read operations;

identifying, in the buffer, a subset of the set of data corresponding to the second set of commands; and transferring the subset of the set of data from the buffer to an output buffer to be sent to a host system based at least in part on identifying the subset of the set of data.

* * * * *